Oct. 11, 1932.  S. Q. LEE  1,882,082
METHOD OF PRODUCING A CONTINUOUS SLAB OF EARTHY MATERIAL
Filed July 14, 1930  3 Sheets-Sheet 1

Witness:
William P. Kilroy

Inventor
Sherman Q Lee
By Samuel W Banning
Atty

Oct. 11, 1932.  S. Q. LEE  1,882,082

METHOD OF PRODUCING A CONTINUOUS SLAB OF EARTHY MATERIAL

Filed July 14, 1930   3 Sheets-Sheet 2

Fig. 2.

Inventor:
Sherman Q Lee

Witness:
William P. Kilroy

Oct. 11, 1932.  S. Q. LEE  1,882,082
METHOD OF PRODUCING A CONTINUOUS SLAB OF EARTHY MATERIAL
Filed July 14, 1930  3 Sheets-Sheet 3
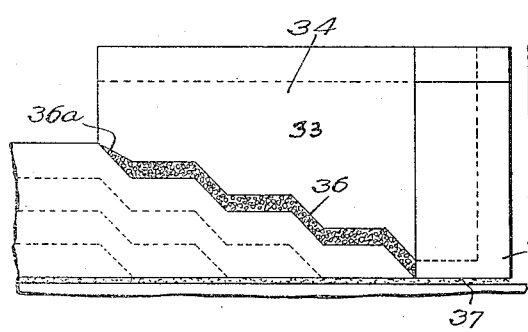
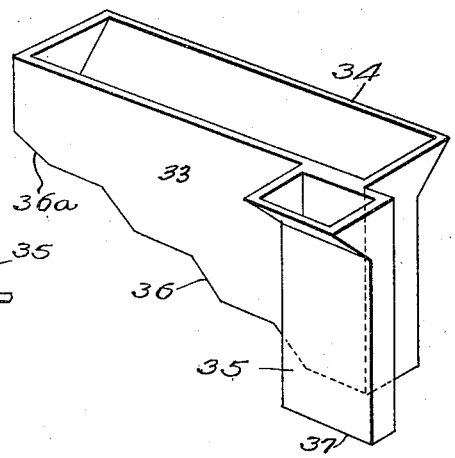
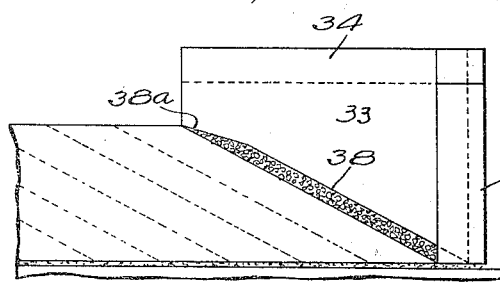
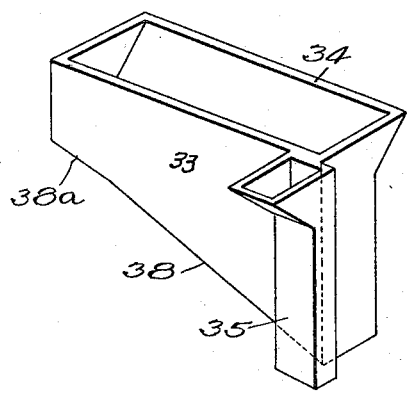
Inventor:
Sherman Q. Lee
Witness:
William P. Kilroy Patented Oct. 11, 1932

1,882,082

UNITED STATES PATENT OFFICE

SHERMAN Q. LEE, OF MADISON, WISCONSIN, ASSIGNOR, BY MESNE ASSIGNMENTS, TO AMERICAN FACE BRICK RESEARCH CORPORATION, A CORPORATION OF ILLINOIS

METHOD OF PRODUCING A CONTINUOUS SLAB OF EARTHY MATERIAL

Application filed July 14, 1930. Serial No. 467,993.

This invention relates to method of producing a continuous slab of earthy material.

In the production of slabs of bloated clay or similar argillaceous or earthy materials, it has been found desirable to progressively build up the slab of bloated material by the adding to its terminus within the bloating chamber of successive charges of granular material in the form of layers, which are subjected to a bloating temperature which causes them to fuse and coalesce with the previously bloated slab, so that the bloating is performed by stages and the bloating temperature applied to relatively thin layers rather than to a deep mass, thereby permitting the heat to penetrate more evenly and thoroughly into each deposited layer, which results in a more uniform and homogeneous product than can otherwise be obtained.

The present invention is directed to a method of building up such a slab or column of bloated material by the addition from time to time of layers of granular material which are spread in an oblique or stepped relation across the terminus of the previously bloated slab, so that a broad surface is afforded for the contact and fusion of the newly deposited granular material, which method also permits of the formation of a slab or column of large cross sectional area, and otherwise facilitates the performance of the various stages of the operation.

The present method has particular application to a bloating operation in which the progressively forming slab or column is moved in a substantially horizontal direction although, if desired, the column may move forwardly on a downward incline, which facilitates the progressive advancement of the column after each succeeding layer has been bloated and fused into a constituent portion of the completed column.

In order to more clearly illustrate the principles of the present invention, reference is had to the accompanying drawings, wherein,—

Fig. 2 is a cross sectional elevation taken on line 2—2 of Fig. 1;

Fig. 3 is a side elevation of one form of charging device adapted to impart a stepped or zigzag formation to the deposited layers of granular material;

Fig. 4 is a perspective view of the charger of Fig. 3;

Fig. 5 is a modification in which the charger is adapted to deposit a smoothly inclined layer of granular material; and Fig. 6 is a perspective view of the charger of Fig. 5.

Figure 1:
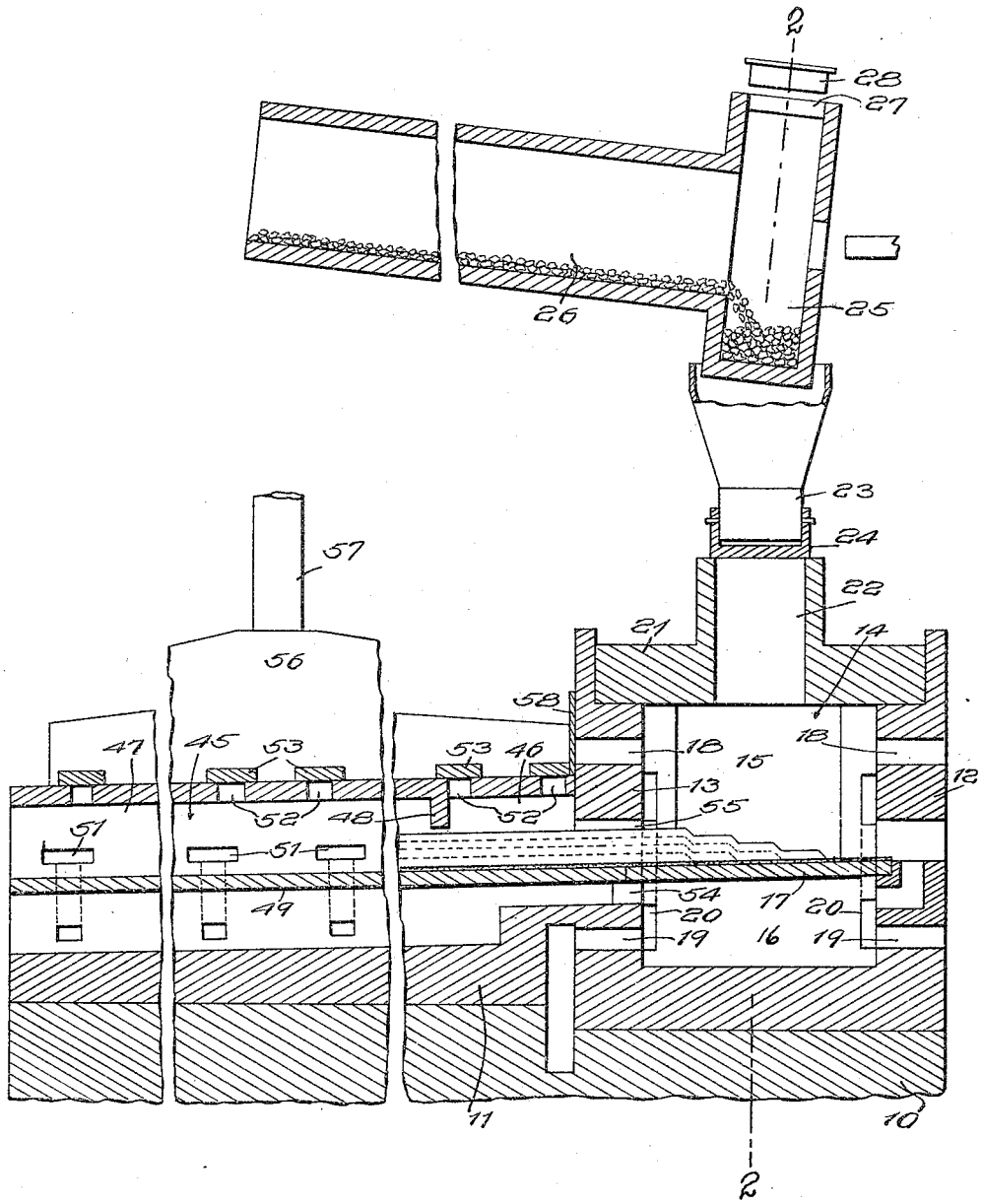
Figure 1 is a longitudinal sectional elevation of a kiln adapted to be operated in accordance with the method of the present invention.

As shown, the kiln is built to afford a slightly inclined hearth for the travel of the slab or column of bloated material, but it will be understood that the degree of inclination, if any, is optional, and that a kiln having a truly horizontal hearth surface may be employed.

The kiln is built upon a foundation 10 upon which is laid a floor 11 of refractory material. The kiln proper is built of refractory materials to provide a front wall 12 and a rear wall 13 enclosing a rectangular chamber, which as a whole constitutes the bloating furnace 14 which comprises an upper combustion chamber 15 constituting a bloating chamber, and a lower combustion chamber 16 separated by a hearth 17, which is preferably formed of carborundum or other highly refractory material, and which, as shown, is set at a slight downward and rearward inclination.

The bloating chamber is provided with burner ports 18, and the lower chamber with burner ports 19, and between the upper and lower chambers are connecting flues 20. The bloating chamber is roofed over by a flat arch 21 provided with a slotted port 22, through which charges of granular earthy material are fed from a hopper 23, below the mouth of which is located a swinging gate 24 for controlling the discharge of granular material.

The mouth of the hopper 23 stands immediately below the drum-shaped collecting head 25 of a rotating preheater 26, which stands in inclined relation and is adapted to feed the granular material progressively downward and to agitate the same during the preheating operation.

The collecting head 25 is provided on one side with a discharge outlet 27 adapted to be closed by a cap 28, which may be removed when desired to downwardly discharge the accumulated mass of granular earthy material from the collecting head into the hopper 23, within which it is retained until the gate 24 is swung to permit of the further discharge of the material into the slotted port 22.

The side walls of the bloating chamber are in the form of slide doors 29 of refractory material, and adjacent to one of the doors and in transverse relation thereto are located a pair of rails 30, constituting a trackway upon which runs a carriage 31 carrying an elongated beam 32 which at its outer end supports a charger 33, which comprises two hopper-shaped sections 34 and 35, the former of which is of larger dimensions and is adapted to hold and discharge a charge of granular earthy material, and the latter of which is adapted to hold and discharge a layer of sand or other parting material, which must be spread upon the hearth in order to prevent adherence of the granular material thereto when in fused condition.

The bottom of the charger may take either the configuration shown in Figs. 3 and 4, or the configuration shown in Figs. 5 and 6. The charger of Figs. 3 and 4 is stepped along the bottom 36 of the compartment 34 for granular material, while the bottom 37 of the compartment 35 is straight and extends below the lowermost level of the bottom 36 and in slightly spaced relation to the hearth, so that sand or other parting material fed through the slot or orifice in the bottom of the compartment 35 will be spread out by the movement of the charger in the form of a thin layer across the surface of the hearth. At the same time, granular material discharged through the slot or orifice from the compartment 34 will be spread out and distributed in the form of a stepped layer upon the stepped inner terminal surface of the previously bloated slab or column.

The sand compartment 35 stands in offset relation to the compartment 34, so that in the charging movement the compartment 35 will precede the compartment 34, thereby spreading the layer of sand or other parting material in advance of the deposit of the granular material over that portion of the bloating chamber where the hearth is exposed for the reception of the lowermost level of the stepped layer of granular material.

Fig. 3 illustrates the hearth having deposited thereon a thin layer of sand, and it will be observed that the width of the compartment 35 is sufficient only to deposit sand or other parting material on the exposed surface of the hearth, leaving the stepped terminus of the previously bloated slab uncoated by sand, so that the newly deposited charge of granular material will lie directly upon the previously bloated surface, so that the newly deposited charge will fuse and bloat and adhere directly to the previously formed portion of the column.

The configuration of the rear end of the bottom 36 of the charger is sloped or beveled at 36$^a$ to a proper degree to cause a deposit of granular material at this point of progressively increasing depth, so that the upper portion of the newly deposited charge when bloated will expand and elevate into flush relationship with the surface of the previously bloated portion of the column, without the formation of grooves or valleys at the points where the succeeding charges are deposited.

The charger of Figs. 5 and 6 is similar in all material respects to that previously described, with the exception that the bottom 38 is evenly sloped or beveled throughout the major portion of its extent, being less beveled at the rear end 38$^a$ to effect a deposit of granular material at this point, which when bloated will come into flush relation with the upper surface of the previously bloated portion of the slab.

As shown, the granular material is subjected to a bloating temperature which serves to expand it to about twice its original volume, and under such conditions the bottom of the charger will stand in spaced relation to the previously bloated exposed terminal surface of the slab at a distance of about one-half the thickness of the bloated layers, which are indicated in dotted lines in Figs. 3 and 5 merely for purposes of clarity, since it will be understood that when the charges are bloated they will completely fuse and coalesce with the previously formed portion of the slab, so that there will be no laminations or joints in the completed product.

Immediately below the hearth 17, the inner walls 39 of the lower combustion chamber are sloped or beveled and communicate with slots 40 laterally adjacent to the hearth, so that any surplus accumulation of sand or earthy material will be discharged from one edge of the hearth as the charger is moved laterally, thus serving to deposit and smooth down a layer of material in preparation for the bloating operation. Surplus sand and granular material which may be thus discharged over the edge of the hearth and upon the sloping walls 39 will accumulate in proximity to doors 41 which may be opened from time to time to remove such accumulation. The sand delivered to the compartment 35 of the charger is discharged from a hopper 42 controlled by a gate 43 which permits the sand to flow through a slotted port 44.

The bloating furnace communicates with an elongated annealer 45, which comprises a soaking chamber 46 and a cooling chamber 47, which are partially separated by a curtain wall 48 sufficiently elevated to permit the movement thereunder of the completely bloated slab of material. The annealing portion of the furnace is separated by a sloping floor 49 in alignment with the hearth 17, which separates the annealing portion of the furnace into upper and lower chambers. The upper and lower sections of the cooling chamber are connected by flues 51, and both the soaking chamber and the cooling chamber are provided in the roof with ports 52 which are closed by cap blocks 53, one or more of which may, if desired, be removed to regulate the temperatures in various portions of the annealing section of the furnace.

The lower chamber of the annealing section is connected with the lower chamber of the bloating furnace by ports 54, and the bloating chamber communicates with the soaking chamber through an aperture 55. The annealing section of the furnace is covered over by a hood 56, which serves to collect gases and products of combustion and discharge the same through a stack 57, and the bloating chamber may be also brought into communication with the hood through the withdrawal of a damper 58 which serves to control the rear burner port 18 leading through the wall of the bloating chamber.

*Operation*

In carrying out the method of the present invention by the use of apparatus of the character described, the charger will be moved inwardly in position to receive a charge of sand or other parting medium into the sand compartment 35, and as the charger moves inwardly above the surface of the hearth, the sand or other parting medium will be discharged through the bottom of the compartment and leveled down into the form of a thin layer by the close proximity of the bottom of the sand compartment to the hearth of the furnace. After the charger has initially traversed the exposed surface of the hearth to complete the deposit of the parting layer, the compartment 36 will be brought into register with the discharge passage 22 for granular material, and will receive a charge of such granular material, which will be distributed and properly spread out in the form of a sloping or stepped layer upon the return movement of the charger.

This brings the major portion of the newly deposited layer into direct contact with the surface of the previously bloated charge and increases the length of the column only by the extent of the granular material newly deposited upon the exposed surface of the hearth. After the newly deposited charge has been bloated and the upper portion thereof brought up into flush relationship with the upper surface of the previously formed column, the column as a whole is advanced to the extent necessary to take care of the new accretion thereto, and the process is repeated.

The above operations result in the production of a continuous slab or column having a depth substantially equal to the vertical elevation of the rear portion of the charger above the level of the hearth, which permits columns of almost indefinitely large cross sectional dimensions to be produced. At the same time, each newly deposited layer will be of such restricted depth as to permit of the thorough and uniform bloating of the same within a bloating chamber of moderate dimensions.

By depositing each succeeding layer in stepped or inclined relation, a widely extended surface is afforded for the contact, adhesion and fusion of the newly deposited layer with the previously bloated surface, so that there will be no cracks, joints or fissures in the completed slab. At the same time, each new deposit serves to insulate the previously bloated surface from the bloating temperature, so that excessive bloating is prevented by a proper timing of the operations, and after each new charge of granular material is deposited, the heat of the mass, at slightly reduced temperature, will be retained during the soaking period, which is highly desirable in order to permit the dissemination and elimination of internal strains and stresses while the material is still in a slightly plastic state and before the temperature has been lowered to the congealing point.

It will be understood that the stepped formation of the newly deposited layer is a mere modification or variant of the inclined deposit, and in the claims it is the intention throughout to cover either method of depositing the layers of granular material, which in each case will be deposited upon the obliquely presented terminal surface of the previously formed portion of the slab or column, so that the term oblique will be employed to designate either an even slope as in Fig. 5, or a stepped or otherwise configured slope as in Fig. 3, the intention being to cover any form of deposit which is applied in layers extending in a generally diagonal direction across the major axis of the slab or column, and at an angle to the direction in which the column progresses during the period of its formation.

It will also be understood that when the operation is first initiated within the furnace it will require several initiatory operations to build the terminus of the column up to the oblique configuration indicated in Figs. 3 and 5, but in the claims these initiatory or preparatory operations will be ignored, and it will be assumed that the steps are being performed in the normal or regular sequence observed after a portion of the column has been built up to the intended thickness.

It will also be understood that the process is applicable to the building up of a column formed from granular material in which the particles are merely fused into adherent relation without being bloated as a column in which the fusion results in the formation of a solid rather than a cellular vitreous structure.

The temperature maintained in the bloating chamber will vary somewhat with different materials, but for certain clays from Central and Eastern Illinois a bloating temperature of approximately 2200° will prove satisfactory. The lower combustion chamber 16 will usually be maintained at a soaking temperature, which for the clays mentioned will ordinarily be in the neighborhood of from 2000° F. to 2050° F., it being understood, however, that the above temperatures are merely for purposes of illustration and will vary with relation to the nature of the materials treated, the length of the bloating period, the thickness of the layer, and other factors of like character.

The layers being relatively thin will be bloated from above and in some cases the lower combustion chamber may be entirely omitted, the hearth in these cases absorbing enough heat through the granular material being bloated and the sand bed to prevent shattering of the bloating material due to temperature shock. It will thus be understood that the method is one which may be modified considerably without departing from the spirit of the invention.

I claim:

1. The method of producing a continuous slab or column of earthy material, which consists in depositing a layer of granular earthy material upon the obliquely disposed terminal surface of the previously completed portion of the slab or column, subjecting the newly deposited layer to a heat treatment to cause fusion and adhesion of the layer to the obliquely disposed surface of the previously completed portion of the column, and thereafter advancing the column with the newly fused accretion.

2. The method of producing a continuous slab or column of earthy material, which consists in depositing a layer of granular material by transverse movement of a stream of such material across the obliquely presented terminal face of the previously completed portion of the column, and in thereafter subjecting the newly deposited layer to a heat treatment to cause fusion and adherence of the layer to the previously formed portion of the column.

3. The method of producing a continuous slab or column of earthy material, which consists in depositing a layer of granular material by transverse movement of a stream of such material across the obliquely presented terminal face of the previously completed portion of the column, and in thereafter subjecting the newly deposited layer to a heat treatment to cause fusion and adherence of the layer to the previously formed portion of the column, and in thereafter advancing the column with the new accretion thereto a distance sufficient to permit the deposit of the next succeeding granular layer of equal depth with the first layer, and successively repeating the heating, charging and advancing operations in the building up of a slab or column of uniform dimensions.

4. The method of producing a continuous slab or column of earthly material, which consists in depositing a layer of granular material by transverse movement of a stream of such material across the obliquely presented terminal face of the previously completed portion of the column, subjecting the newly deposited layer to a bloating temperature to cause bloating of the mass and fusion with the previously formed portion of the column and expansion of the portion of the newly deposited layer contiguous to the upper surface of the slab into flush relationship therewith, and in advancing the column with the new accretion thereto in the amount necessary to permit the deposit of a succeeding layer of like depth, and in repeating the bloating, charging and advancing operations in the production of a continuous slab or column of uniform dimensions.

5. The method of producing a continuous slab or column of bloated earthy material, which consists in first depositing a layer of parting material to prevent adhesion and in thereafter depositing a layer of granular material, in part in contact with the parting material and in part in contact with the obliquely presented terminal surface of the previously formed portion of the slab or column, subjecting the newly deposited layer to a bloating temperature to cause fusion and adhesion to the surface of the previously formed portion of the column, and bloating and expansion to bring the portion of the granular layer contiguous to the upper surface of the column into flush relationship therewith, advancing the column with the new accretion, and repeating the operations in the production of a continuous column of uniform dimensions.

6. The method of producing a continuous slab or column of bloating earthy material, which consists in first directing and leveling down a stream of parting material by transverse movement to afford a layer of said parting material at the terminus of the obliquely presented terminal surface of the previously formed portion of the slab or column, thereafter depositing a layer of granular earthy material by transversely moving and gauging down a stream of granular material across the obliquely presented face of the terminus of the column, subjecting the newly deposited layer to a bloating temperature to cause fusion and adhesion to the previously formed portion of the column, and bloating and expansion of the granular material to bring the portion thereof contiguous to the upper surface of the previously formed portion of the column into flush relationship therewith, advancing the column with the new accretion, and repeating the operations in the production of a continuous column of material.

7. The method of producing a continuous slab or column of earthy material, which consists in depositing a layer of granular material, subjecting the layer to a heat treatment to cause fusion of the particles into an integral portion of the slab or column, depositing a second layer of granular earthy material in overlapping relation upon the terminal surface of the previously completed portion of the slab or column, subjecting the newly deposited layer to a heat treatment to cause fusion and adhesion of the layer to the overlapped surface of the previously completed portion of the column, and thereafter advancing the column with the newly fused accretion.

8. The method of producing a continuous slab or column of earthy material, which consists in depositing a layer of granular earthy material, subjecting the same to a bloating temperature to cause fusion of the granular particles with each other and expansion by bloating due to the liberation of gases to form an integral section of the intended slab or column, advancing said section to provide space for a succeeding operation, depositing a second layer of granular earthy material in overlapping relation to the terminal surface of the previously bloated portion of the column, subjecting the newly deposited layer to a bloating temperature to cause fusion of the particles with each other and with the contacted surface of the previously formed portion of the column and to cause expansion by bloating of the newly deposited layer by the formation of gases within the interior to elevate the surface of the newly bloated layer, and advancing the column with the new accretion thereto.

9. The method of producing a continuous slab or column of material, which consists in depositing a layer of granular earthy material and subjecting the same to a bloating temperature to cause fusion of the particles and expansion by bloating due to the formation of gases within the interior, depositing a second layer of granular earthy material in part upon the top surface of the previously bloated layer and in stepped down formation and beyond the terminus of the previously bloated layer, subjecting the newly deposited layer to a bloating temperature to cause fusion of the granular particles and adherence to the underlying previously bloated layer and to cause expansion by bloating of the newly deposited layer, advancing the column with the new accretion thereto, and in depositing and bloating succeeding layers in the building up of a continuous column of uniform thickness.

10. The method of producing a continuous slab or column of material, which consists in depositing a layer of granular earthy material and subjecting the same to a heat treatment to cause fusion of the particles with one another in the formation of a unified section of the intended slab, depositing a second layer in part upon the upper surface of the unified first layer and in part in stepped down relation beyond the terminus thereof, subjecting the second layer to a heat treatment to cause fusion of the granular particles and adherence to the underlying surface of the first layer, and advancing the column with the new accretion thereto.

11. The method of producing a continuous slab or column of material, which consists in depositing a layer of granular earthy material and subjecting the same to a heat treatment to cause fusion of the particles with one another in the formation of a unified section to the intended slab, depositing a second layer in part upon the upper surface of the unified first layer and in part in stepped down relation beyond the terminus thereof, subjecting the second layer to a heat treatment to cause fusion of the granular particles and adherence to the underlying surface of the first layer, and advancing the column with the new accretion thereto, and in repeating the operations in the formation of a continuous slab of indefinite length and of the desired thickness.

In witness that I claim the foregoing I have hereunto subscribed my name this 2nd day of July, 1930.

SHERMAN Q. LEE.